UNITED STATES PATENT OFFICE.

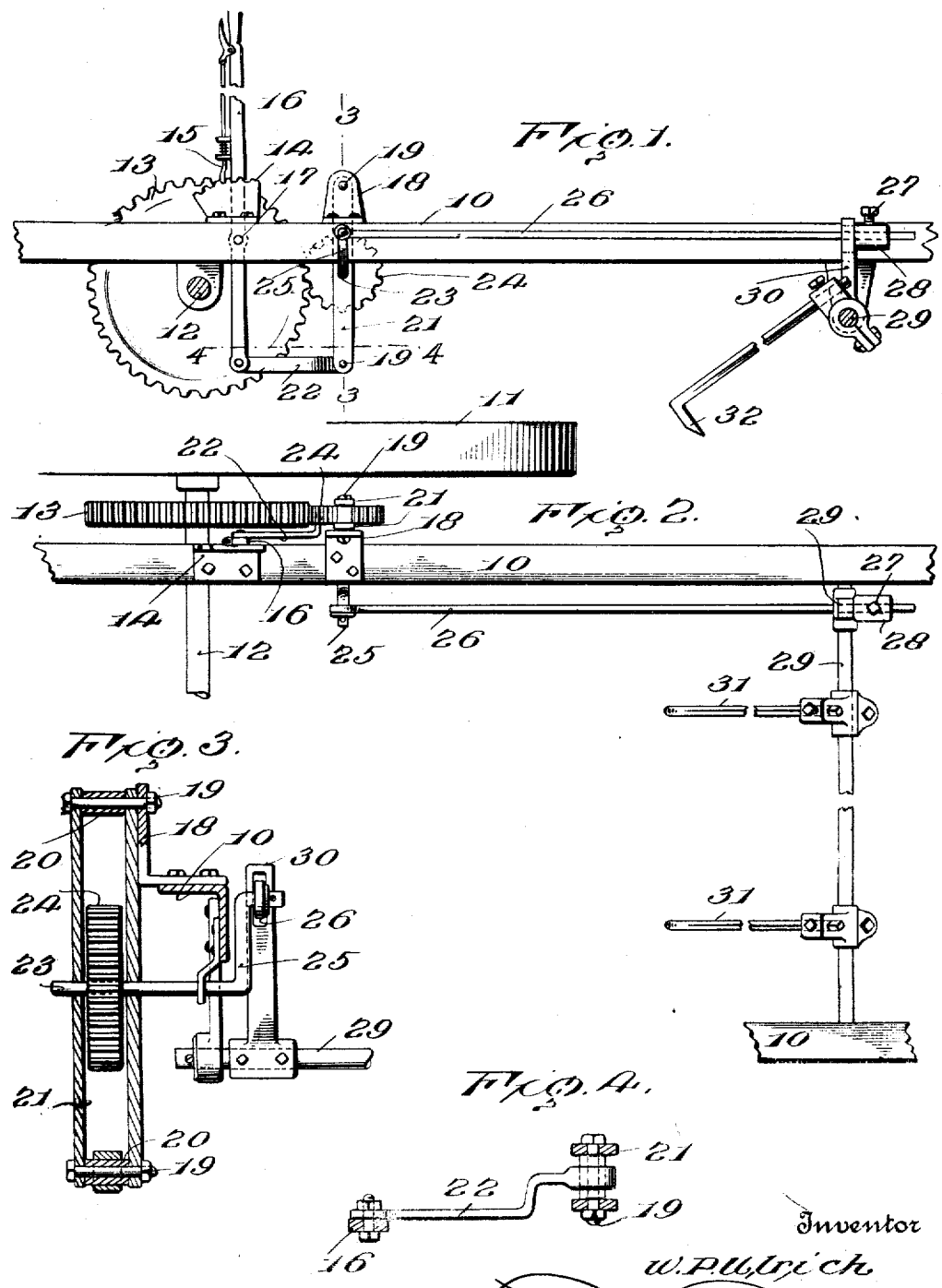

WILLIAM P. ULRICH, OF OSLO, MINNESOTA.

MECHANICAL MOVEMENT.

1,351,978.  Specification of Letters Patent.  Patented Sept. 7, 1920.

Application filed February 8, 1919. Serial No. 275,859.

*To all whom it may concern:*

Be it known that I, WILLIAM P. ULRICH, a citizen of the United States, residing at Oslo, in the county of Marshall, State of Minnesota, have invented certain new and useful Improvements in Mechanical Movements; and I do hereby declare the following to be a full, clear, and exact description of the invention, such as will enable others skilled in the art to which it appertains to make and use the same.

This invention relates to new and useful improvements in corn planters and particularly to automatically checking and marking planters.

One object of the present invention is to provide a novel and improved structure which obviates the use of the ordinary check wire.

Another object is to provide a novel and improved structure of this character which includes means for throwing the checking and marking means into and out of gear.

Other objects and advantages will be apparent from the following description when taken in connection with the accompanying drawing.

In the drawing:

Figure 1 is a side elevation of a portion of a corn planter showing my invention applied thereto, the wheel of the planter being removed.

Fig. 2 is a top plan view of the same.

Fig. 3 is a vertical sectional view taken on the line 3—3 of Fig. 1, looking toward the right of said figure.

Fig. 4 is a sectional view taken on line 4—4 of Fig. 1.

Referring particularly to the accompanying drawings, 10 represents a portion of the frame of a corn planter, and 11 the ground engaging wheel which is carried by the axle 12. Mounted on the axle, between the wheel 11 and the frame, and arranged to rotate with the axle, is a large pinion 13, which will be more particularly referred to later.

On the frame, forwardly of the axle, there is secured the rack segment 14, which is engaged by the detent 15 of the lever 16, said lever being mounted on the side of the frame by means of the bolt 17. Also mounted on the frame, forwardly of the lever, is a bracket 18. Disposed vertically in parallel relation, and held in spaced relation by the bolts 19 and the spacing sleeves 20, are the arms 21, the upper bolt of which is engaged with the bracket to pivotally support the arms. To the lower ends of the arms, and to the lower end of the lever 16 there is pivotally connected a link 22. Disposed between the arms and mounted on the shaft 23, extending between said arms, is a pinion 24 which meshes with the beforementioned pinion 13. On the inner end of the shaft 23 there is formed a crank 25 to which is pivotally connected a forwardly extending pitman rod 26, and slidably adjustable on the forward end of the pitman, by means of the screw 27, is a collar 28. Disposed transversely of the planter, and operatively connected witth the seed plates of the hoppers thereof, ;= a shaft 29 having secured thereon the trip arms 30, which extend radially from the shaft and in position to be engaged by the collar 28, when said pitman is moved rearwardly by the crank 25. The shaft 29 extends throughout the width of the planter, and on each end of the shaft there is mounted a radially extending arm 31, each arm having its outer end turned downwardly and formed with a sharpened nose, as shown at 32, for engagement in the ground to mark the position of the seed deposited by the seed hoppers. These arms 31 are, as will be clearly understood, actuated simultaneously with the trip arms 30, so that each time a quantity of seed is deposited, a mark is made in the ground.

It will be noted that the trip arms are actuated by the automatic means operated by the ground engaging wheels, whereby the use of the ordinary knotted check wire is obviated, the machine being adapted to mark as well as check the rows planted.

By means of the lever 16 the depending arms 21 are adapted to be swung on the upper bolt 19, whereby the pinion 24 is moved into and out of meshing engagement with the larger pinion 13.

What is claimed is:

1. A mechanism for converting continuous rotary motion into intermittent oscillatory motion, including a driven pinion, a driving pinion, means for moving the driven pinion into and out of engagement with the driving pinion, a rock shaft, and means actuated by the driven pinion for operating the rock shaft.

2. A mechanism for converting continuous rotary motion into intermittent oscillatory motion, including a driving means, a driven means connected therewith, means for swinging the driven means into and out of engagement with the driving means, a shaft, a radial trip arm on the shaft, and means carried by the driven means for engagement with the trip arm to actuate the shaft.

3. A mechanism for converting continuous rotary motion into intermittent oscillatory motion, including a driving pinion, a driven pinion mounted for swinging movement toward and away from the driving pinion, a rock shaft, a crank on the driven pinion, a trip arm on the rock shaft, and a pitman connected with the crank and operatively engaged with the trip arm.

4. A mechanism for converting continuous rotary motion into intermittent oscillatory motion comprising a driving shaft, a pinion on the shaft, a driven shaft, a pinion on the driven shaft and meshing with the first pinion, a rock shaft having a radial arm, a crank on the driven shaft, and an operating link connected to the crank and loosely engaged with the radial arm for rocking the rock shaft in one direction only.

In testimony whereof I affix my signature in the presence of two witnesses.

WILLIAM P. ULRICH.

Witnesses:
I. N. LADSEN,
JOHANNES JOHANSAN.